(12) United States Patent
Asai et al.

(10) Patent No.: US 7,228,297 B2
(45) Date of Patent: Jun. 5, 2007

(54) DATABASE SYSTEM, DATABASE SERVER, AND METHOD OF CONTROLLING THE OPERATION OF A DATABASE SERVER

(75) Inventors: Arito Asai, Asaka (JP); Mikio Watanabe, Asaka (JP); Hiroshi Suganuma, Asaka (JP)

(73) Assignee: Fujifilm Corporation, Tokyo (JP)

( * ) Notice: Subject to any disclaimer, the term of this patent is extended or adjusted under 35 U.S.C. 154(b) by 317 days.

(21) Appl. No.: 10/068,895

(22) Filed: Feb. 11, 2002

(65) Prior Publication Data

US 2002/0111940 A1 Aug. 15, 2002

(30) Foreign Application Priority Data

Feb. 13, 2001 (JP) ............................. 2001-034795

(51) Int. Cl.
G06F 17/30 (2006.01)
(52) U.S. Cl. ............... 707/3; 707/10; 707/5; 707/6; 707/102; 707/200; 707/101
(58) Field of Classification Search ............ 707/3, 707/10, 104.1, 5, 1, 200, 6, 102, 101; 709/203, 709/217; 711/162, 163, 164, 152; 710/3, 710/5; 715/500
See application file for complete search history.

(56) References Cited

U.S. PATENT DOCUMENTS

| | | | | |
|---|---|---|---|---|
| 5,720,028 A | * | 2/1998 | Matsumoto et al. | 714/9 |
| 5,819,273 A | * | 10/1998 | Vora et al. | 707/10 |
| 6,006,231 A | | 12/1999 | Popa | |
| 6,061,696 A | * | 5/2000 | Lee et al. | 715/513 |
| 6,122,648 A | * | 9/2000 | Roderick | 715/513 |
| 6,134,559 A | | 10/2000 | Brumme et al. | |
| 6,466,952 B2 | * | 10/2002 | Hanes et al. | 707/205 |
| 6,480,836 B1 | * | 11/2002 | Colby et al. | 707/3 |
| 6,484,245 B1 | * | 11/2002 | Sanada et al. | 711/164 |
| 6,694,413 B1 | * | 2/2004 | Mimatsu et al. | 711/162 |
| 6,708,189 B1 | * | 3/2004 | Fitzsimons et al. | 707/205 |
| 6,708,199 B2 | * | 3/2004 | Ohtani et al. | 709/202 |
| 6,760,720 B1 | * | 7/2004 | De Bellis | 707/3 |
| 6,850,928 B1 | * | 2/2005 | McClure et al. | 707/3 |
| 2003/0041059 A1 | * | 2/2003 | Lepien | 707/5 |

FOREIGN PATENT DOCUMENTS

| | | |
|---|---|---|
| EP | 0 992 922 A | 4/2000 |
| WO | WO 00/62264 | 10/2000 |
| WO | WO 00/75849 | 12/2000 |
| WO | WO 01/01277 | 1/2001 |

OTHER PUBLICATIONS

European Search Report dated Nov. 10, 2004.

* cited by examiner

*Primary Examiner*—Cam-Y Truong
(74) *Attorney, Agent, or Firm*—McGinn IP Law Group, PLLC (57) ABSTRACT

A database system is provided with a search unit for searching image attribute information that has been stored in a relational database management system. A search interface is provided between the search unit and a command execution unit, which applies a search command to the search unit. The command execution unit and search unit can be connected in detachable fashion. Thus a search unit that has been connected to the command execution unit can be replaced by detaching it and connecting a search unit that employs another search technique.

19 Claims, 8 Drawing Sheets

| ATTRIBUTE NAME | CONTENT |
|---|---|
| No. | IMAGE IDENTIFICATION NO. |
| Tel | OWNER TELEPHONE NO. |
| Age | AGE OF OWNER |
| Name | OWNER NAME |
| Title | TITLE |
| Keyword | KEYWORD |
| Memo | MEMO |
| Album | ALBUM NAME |
| Public | GRAPH INDICATING WHETHER PUBLIC DISCLOSURE IS POSSIBLE |

Fig. 3b

| ATTRIBUTE NAME | No. | Tel | Age | Name | |
|---|---|---|---|---|---|
| | 1 | 048-468-×××× | 31 | TARO TOKKYO | |
| | 2 | 048-468-○○○○ | 35 | HANAKO JITSUYO | |
| | 3 | 048-468-△△△△ | 27 | ICHIRO ISYO | |
| | | | | | |

Fig. 4

| EXPRESSION FORMAT | CONTENT |
|---|---|
| Original | ORIGINAL-IMAGE DATA |
| Card | 300 X 300 PIXEL JPEG DATA; FOR PERSONAL COMPUTERS |
| Thumbnail | 80 X 80 PIXEL, 4-TONE JPEG DATA; FOR PERSONAL COMPUTERS |
| CELL PHONE A-1 | 94 X 72 PIXEL, MONOCHROME BILEVEL GIF IMAGE; FOR CELL PHONES |
| CELL PHONE A-2 | 94 X 72 PIXEL, 4-TONE GRAY GIF IMAGE; FOR CELL PHONES |
| CELL PHONE A-3 | 94 X 72 PIXEL, 256-COLOR GIF IMAGE; FOR CELL PHONES |
| CELL PHONE A-4 | 118 X 114 PIXEL, MONOCHROME BILEVEL GIF IMAGE; FOR CELL PHONES |
| CELL PHONE A-5 | 118 X 114 PIXEL, 4-TONE GRAY GIF IMAGE; FOR CELL PHONES |
| CELL PHONE A-6 | 118 X 114 PIXEL, 256-COLOR GIF IMAGE; FOR CELL PHONES |
| CELL PHONE B-1 | 96 X 72 PIXEL, 4-TONE GRAY PNG IMAGE; FOR CELL PHONES |
| CELL PHONE B-2 | 94 X 72 PIXEL, 256-COLOR PNG IMAGE; FOR CELL PHONES |
| CELL PHONE B-3 | 120 X 112 PIXEL, 4-TONE GRAY PNG IMAGE; FOR CELL PHONES |
| CELL PHONE B-4 | 120 X 112 PIXEL, 256-COLOR PNG IMAGE; FOR CELL PHONES |
| Print | JPEG DATA TRIMMED TO 80 X 60 PIXELS; FOR PRINT PREVIEW |

*Fig. 5*

| No. | STORED DATA |
|---|---|
| 1 | Original, Card, Thumbnail, CELL PHONE A-1, CELL PHONE A-2, Print |
| 2 | Original, Card, CELL PHONE A-1, CELL PHONE B-1, CELL PHONE B-2, Print |
| 3 | Original, Card, Thumbnail, CELL PHONE B-1, CELL PHONE B-2, Print |
| | |

DATABASE SYSTEM, DATABASE SERVER, AND METHOD OF CONTROLLING THE OPERATION OF A DATABASE SERVER

BACKGROUND OF THE INVENTION

1. Field of the Invention

This invention relates to a database system, a data-storage control system, a database server and a method of controlling operation of the database server.

2. Description of the Related Art

A database system includes a command execution unit and a search unit for searching a database in which data has been stored. If a command is applied to the command execution unit, the command execution unit applies a search command to the search unit, which responds by searching the database. Data representing the search results is supplied from the search unit to the command execution unit so that the data is output.

In a case where a database search is conducted using a search technique different from the search technique of the search unit connected to the command execution unit, another search unit must be used in place of the search unit connected to the command execution unit. However, the procedure through which commands and data are exchanged by the command execution unit and search unit is known only to the party that manufactured the command execution unit and search unit. This means that substituting another search unit for the search unit connected to the command execution unit is not conceivable. In order to conduct a database search using a search technique different from that of a search unit connected to a command execution unit, both the command execution unit and the search unit must be modified in accordance with the search technique.

If data is image data or the like, image data having a variety of expression formats, such as image data representing an image of the original size or image data representing a thumbnail image, is stored in a database. If both original-image data and thumbnail-image data have been stored in a database, applying a search command makes it possible to find the corresponding original-image data or thumbnail-image data by a search.

However, if image data having an expression format specified by a search command does not exist in a case where only one type of image data, namely the original-image data or thumbnail-image data, has been stored in the database, this image data cannot be found even though the image data having the other expression format is present. For example, when a search command for image data that is thumbnail-image data has been applied, a hit regarding original-image data will not be obtained even though original-image data corresponding to this thumbnail-image data exists. This means that the search command must be applied again upon changing the expression format. In other words, a search command for original-image data must be applied again.

Furthermore, if the result of a search is failure to obtain a hit in a particular database, the same search command must be applied to other databases.

DISCLOSURE OF THE INVENTION

Accordingly, an object of the present invention is to so arrange it that a search unit can be exchanged by disconnecting it from a command execution unit.

Another object of the present invention is to make it unnecessary to re-apply a search command upon changing the expression format thereof.

A further object of the present invention is to so arrange it that merely applying a single search command makes it possible even for other database servers to conduct a search.

A database system according to a first aspect of the present invention comprises a database in which data has been stored in accessible form; a search device (search means) for accessing the database in accordance with an applied search command and searching data that has been stored in the database; a command execution device (command execution means), to which a command is entered, for applying a search command to the search device in accordance with this entered command; and a first interface for separably connecting the search device and the command execution device.

In accordance with the first aspect of the present invention, a first interface is provided. Since the first interface connects the search device and the command execution device in such a manner that the two can be separated from each other, the search device connected to the command execution device can be disconnected and a different search device can be connected to the command execution device. This means that a search device employing a desired search technique can be connected to the command execution device.

Preferably, the database further comprises a storage device for storing data readably; a storage controller for accessing the storage device and reading data that has been stored in the storage device or writing data to the storage device in accordance with an applied read/write command; and a second interface for separably connecting the storage controller and the command execution device. In this case, the command execution device would apply the read/write command to the storage controller in accordance with the entered command (or in accordance with the results of the search conducted by the search device).

A second interface is provided. Since the second interface connects the storage controller and the command execution device in such a manner that the two can be separated from each other, the storage controller connected to the command execution unit can be disconnected and a different storage controller can be connected to the command execution device. This means that a desired storage controller can be connected to the command execution device.

A data storage control system according to a second aspect of the present invention comprises an expression-format changing device (expression-format changing means) for changing applied data to data having a prescribed expression format; a storage device for storing data in readably; a storage controller for accessing the storage device and reading data that has been stored in the storage device or writing data, the expression format of which has been changed by the expression-format changing device, to the storage device in accordance with an applied read/write command; and a command execution device, to which an applied command is entered, for applying a read/write command to the storage controller in accordance with the entered command.

In accordance with the second aspect of the present invention, applied data is changed to data of a prescribed expression format by the expression-format changing device. Data whose expression format has been changed is written to the storage device by the storage controller. As a result, data having a prescribed expression format is written to the storage device. If a command for applying a search command having the prescribed expression format written to the storage device is applied, then data that has been stored in the database can be found.

Data generating means (a data generating device) may be provided. If a command is applied for the purpose of extracting data having a specific expression format from data that has been stored in the storage device, this data (e.g., thumbnail-image data) having the specific expression format does not exist but data that is substantially the same (e.g., original-image data) except for the expression format does exist, the data generating device generates data having the specific expression format from the data that is substantially the same.

An interface for separably connecting the expression-format changing device, the storage control device and the command execution device may be provided.

A database server according to a third aspect of the present invention comprises a first receiving device for receiving a search command transmitted via a network; a search device for searching the database based upon the search command received by the first receiving device; a transmitting device for transmitting the search command, which has been received by the first receiving device, to another database server; a second receiving device for receiving data, which represents search results, transmitted from the other database server in accordance with transmission of the search command to the other database server by the transmitting device; and an output device for outputting, in mutually correlated form, data representing search results obtained by the search by the search device and data representing search results received by the second receiving device.

The third aspect of the present invention provides also an operation control method applied to the above-described database server. Specifically, the third aspect of the invention provides a method of controlling operation of a database server, comprising the steps of receiving a search command transmitted via a network; searching a database based upon the received search command; transmitting the received search command to another database server; receiving data, which represents search results, transmitted from the other database server in accordance with transmission of the search command to the other database server; and outputting, in mutually correlated form, data representing search results obtained by the search and data representing received search results.

In accordance with the third aspect of the present invention, a search command transmitted via a network is received and a database is searched based upon the received search command. The received search command is transmitted to other database servers as well.

Another database server that has received the search command conducts a database search to find the relevant data. The data that is found is sent from the server of the other database to the database server that transmitted the search command.

Data transmitted from the server of the other database and found as a result of the search by this other database server is received by the database server that received the search command. The data found by the server of the other database is correlated with the data found by the search conducted by the database that received the search command via the network. The correlated data is output.

Thus, merely by receiving a single search command, a search can be conducted not only by a single database server that received the search command but also by other database servers.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

A preferred embodiment of the present invention will now be described with reference to the drawings.

Figure 1:
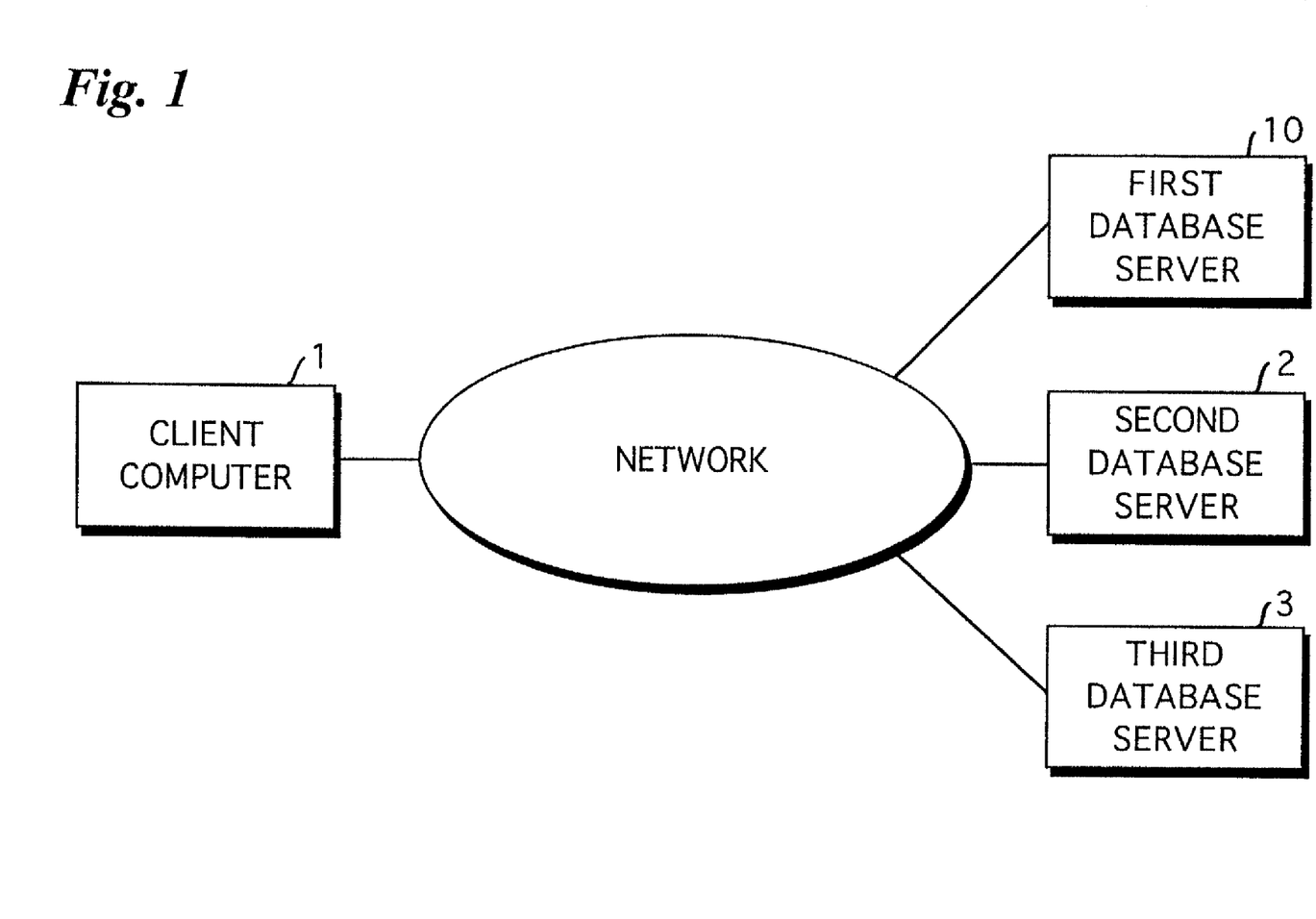
FIG. 1 illustrates the relationship between a client computer and database servers.

FIG. 1, which illustrates a preferred embodiment of the invention, shows the relationship between a client computer 1 and a plurality of database servers 2, 3 and 10 connected to a network.

The client computer 1 and database servers 2, 3 and 10 are capable of communicating with one another via the network, and image data has been stored in each of the database servers 2, 3 and 10.

In this embodiment of the invention, the user of the client computer 1 enters a search command and a command that designates that database server that is to conduct a search. (It is assumed here that the first database server 10 has been designated.) The entered search command is transmitted from the client computer 1 to the designated first database server 10. The latter receives the search command and its image data is searched in accordance with the received search command.

The search command entered from the client computer 1 is transferred further to the second database server 2 and third database server 3 besides the first database server 10 designated by the client computer 1. Search processing is executed by the second database server 2 and third database server 3 and image data found by the search is transmitted from the second database server 2 and third database server 3 to the first database server 10.

Data retrieved by the search of database servers 2, 3 and 10 is transmitted from the first database server 10 to the client computer 1.

The foregoing will become clearer from the description that follows.

Figure 2:
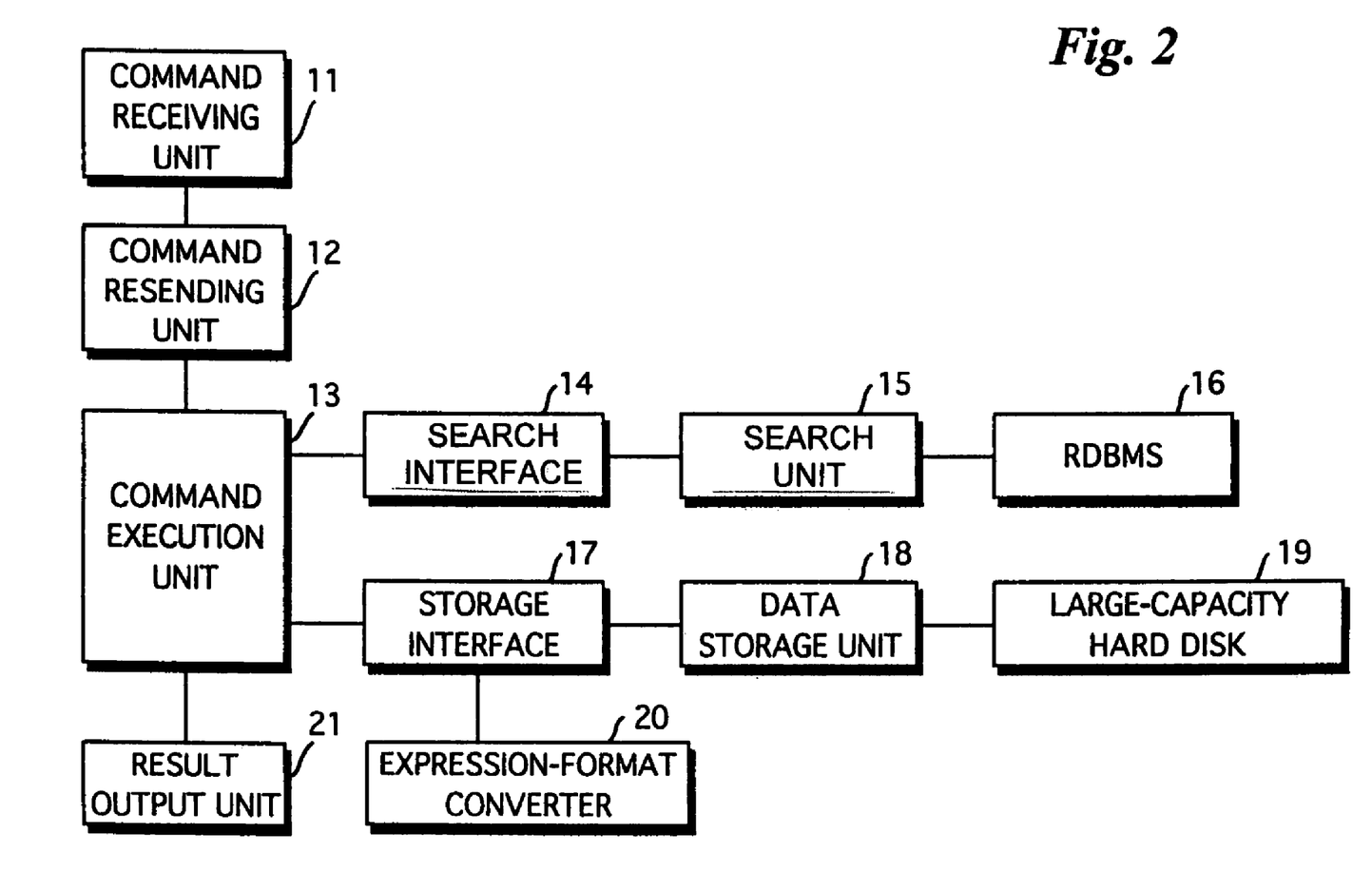
FIG. 2 is a block diagram illustrating the electrical construction of a database server.

FIG. 2 is a block diagram illustrating the electrical construction of the first database server 10. The second database server 2 and third database server 3 are constructed in a manner similar to that of the first database server 10.

The first database server 10 includes a large-capacity hard disk 19 in which image data representing images of a large number of frames has been stored. Image data is read from and written to the hard disk 19 by a data storage unit 18.

The first database server 10 includes a relational database management system (RDBMS) 16 in which attribute information regarding the image data that has been written to the hard disk 19 has been stored in table form. The attribute information in the RDBMS 16 is searched by a search unit 15.

Figure 3A:
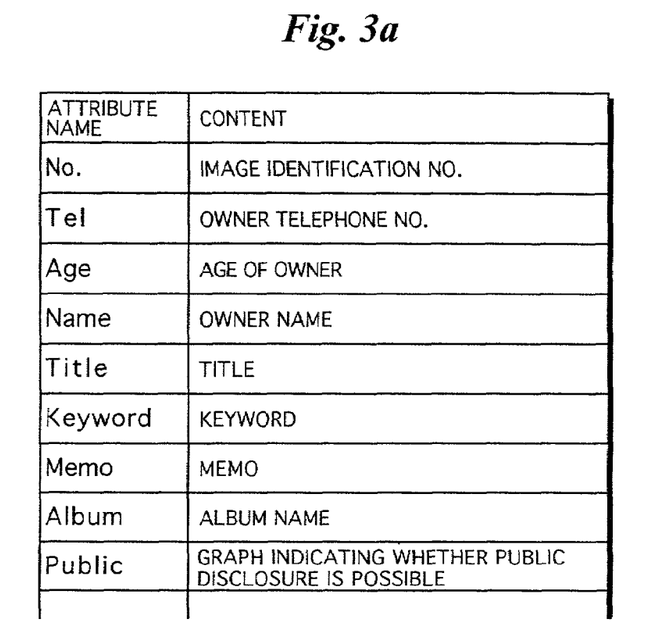
FIGS. 3a and 3b illustrate an example of an attribute table.
Figure 3B:
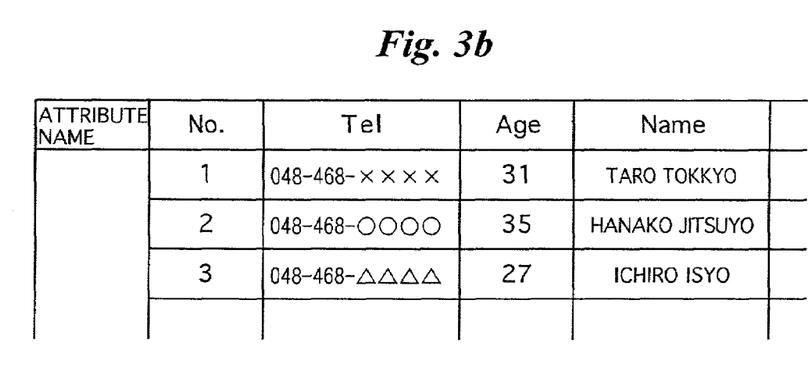

FIGS. 3a and 3b illustrate an attribute table that has been stored in the RDBMS 16. FIG. 3b illustrates the attribute table of FIG. 3a in greater detail.

As shown in FIG. 3a, attribute information contained in the attribute table includes the identification number (No.) of an image represented by image data that has been stored in the large-capacity hard disk 19, the telephone number (Tel) of the owner (the copyright owner) of the image, the age (Age) of the owner of the image, and the name (Name) of the owner of the image, etc.

As shown in FIG. 3b, these items of attribute information have been stored in further detail in correspondence with identification numbers. By specifying an identification number, one can ascertain the image data corresponding to this identification number and detailed attribute information concerning the image represented by this image data.

The search command transmitted from the client computer 1 as mentioned above is received by a command receiving unit 11 via the network. The received search command is input to a command resending unit 12.

The search command is transmitted to the second and third database servers 2, 3 in addition to the first database server 10 by the command resending unit 12. Image-data search processing is executed by the second and third database servers 2, 3 in a manner similar to that of the first database server 10. Image data retrieved by the search processing is sent back to the first database server 10 from the second and third database servers 2, 3.

The search command received by command receiving unit 11 is input also to a command execution unit 13 via the command resending unit 12. The command execution unit 13 applies the search command of the RDBMS 16 to the search unit 15. The search command from the command execution unit 13 is input to the search unit 15, whereby processing is executed to search the RDBMS 16. Provided between the command execution unit 13 and search unit 15 is a search interface 14 for connecting the command execution unit 13 and search unit 15 in such a manner that the two can be separated from each other.

The search unit 15 that has been connected to the command execution unit 13 can be replaced by another search unit by virtue of the search interface 14. The RDBMS 16 can be searched by utilizing a search unit that employs a search technique different from that of the search unit that has been connected to the command execution unit 13. It is assumed that the command execution unit 13 and search unit 15 have been manufactured by the same maker and that the user knows the procedure for reading data (transmitting data) between the command execution unit 13 and search unit 15. Even if the search unit 15 that has been connected to the command execution unit 13 is replaced by a new search unit, therefore, the user will know the procedure by which reading between the new search unit and command execution unit 13 is performed. A search unit suited to the command execution unit 13 can be connected.

Similarly, a storage interface 17 is provided between the command execution unit 13 and data storage unit 18. By thus providing the storage interface 17, the data storage unit 18 that has been connected to the command execution unit 13 can be replaced by another data storage unit.

An expression-format converter 20 is further connected to the storage interface 17. The expression-format converter 20 converts the size (resolution) of an image represented by image data (i.e., implements an expression-format conversion). Though the same subject is represented by the conversion of expression format, image data representing a plurality of images of different sizes is generated. Image data representing a plurality of images generated by the expression-format converter 20 is written to the large-capacity hard disk 19 by the data storage unit 18.

Figure 4:
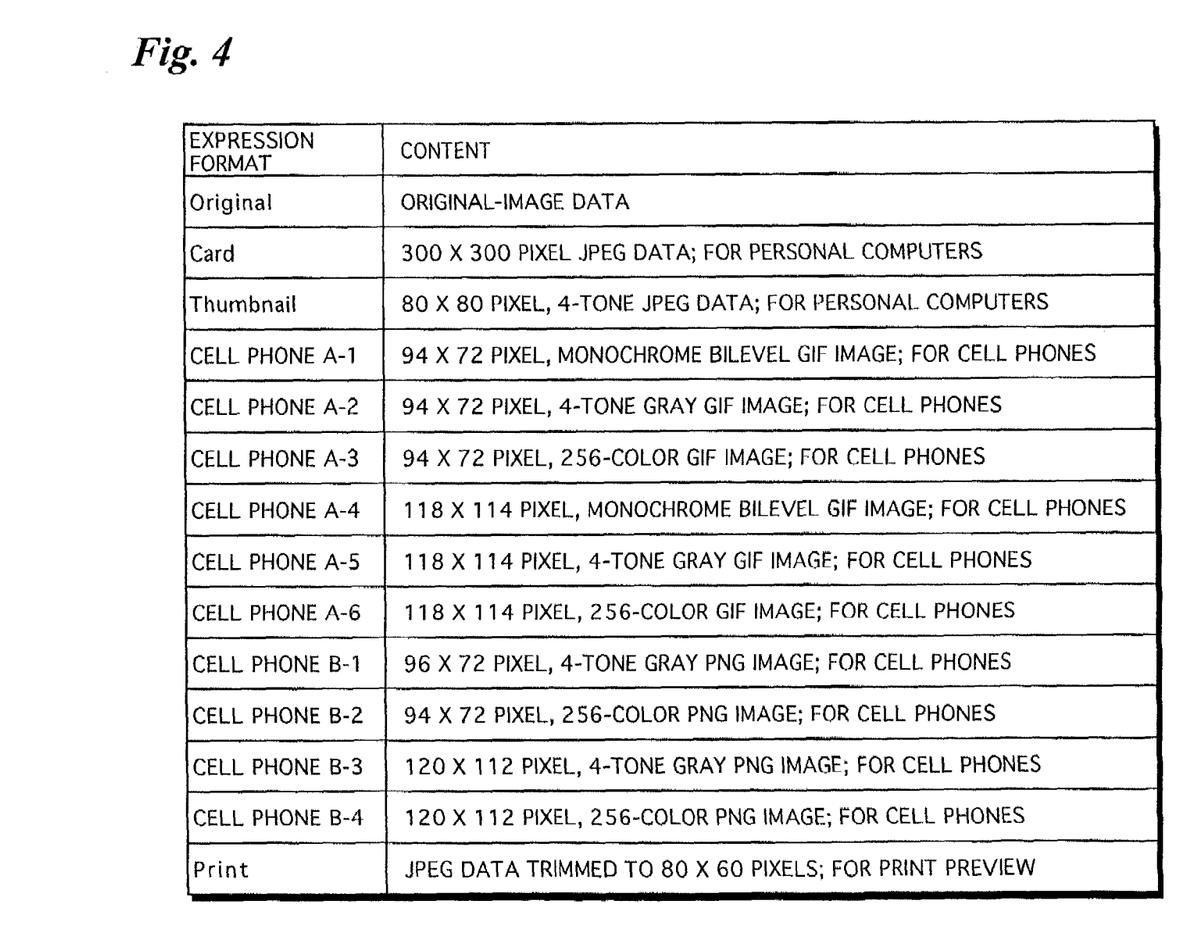
FIG. 4 illustrates a table of expression formats.

FIG. 4 illustrates expression formats, which are converted by the expression-format converter 20, and the content of each format.

Examples of expression formats are Original (which indicates original-image data); Card [an image of 300×300 pixels for a personal computer, this being JPEG (Joint Photographic Experts Group) data]; Thumbnail (an image of 80×80 pixels for a personal computer, this being JPEG data); cellular phone A (cell phones A-1 to A-6) [GIF (Graphics Interchange Format) image data for cell phones]; cellular phone B (cell phones B-1 to B-4) [PNG (Portable Network Graphics) image data for cell phones]; and Print (image data for print preview, this being JPEG data of 80×60 pixels).

The table regarding such expression formats has been stored beforehand in the expression-format converter 20. When image data is written to the large-capacity hard disk 19, the original-image data is converted to the expression formats of the expression-format table that has been stored in the expression-format converter 20. The image data obtained by the conversion is written to the hard disk 19.

When image data having an expression format not present in the expression-format table that has been stored in the expression-format converter 20, the new expression format is stored in the expression-format table. If the image data is applied after the new expression format is stored, this image data is converted so as to have the new expression format and is stored in the large-capacity hard disk 19. Accordingly, image data that has been written to the hard disk 19 is not necessarily image data corresponding to all expression formats. Thus the types of expression formats stored differ for every image.

Figure 5:
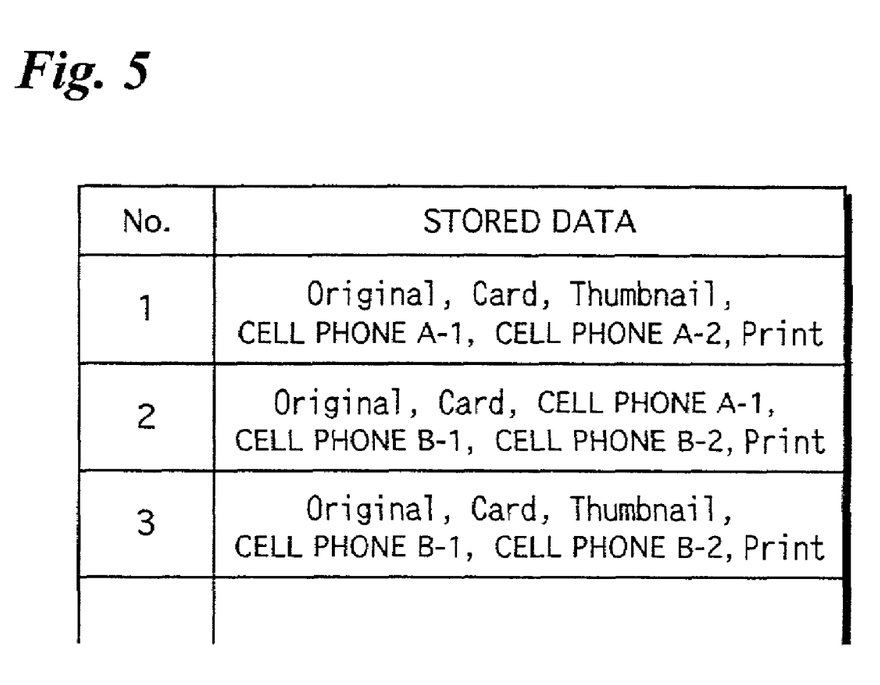
FIG. 5 illustrates the relationship between images of stored expression formats and image identification numbers.

For example, if an image is one whose image identification number is No. 1, as shown in FIG. 5, then image data having the expression formats Original, Card, Thumbnail, Cell Phone A-1, Cell Phone A-2 and Print (this image data represents substantially the same image of a subject and differs only in terms of image size) will have been stored on the large-capacity hard disk 19. If an image is one whose image identification number is No. 2, then image data having the expression formats Original, Card, Cell Phone A-1, Cell Phone B-1, Cell Phone B-2 and Print will have been stored on the large-capacity hard disk 19. If an image is one whose image identification number is No. 3, then image data having the expression formats Original, Thumbnail, Cell Phone B-1, Cell Phone B-2 and Print will have been stored on the large-capacity hard disk 19. It goes without saying that at least image data having the Original expression format will have been stored on the hard disk 19.

Figure 6:
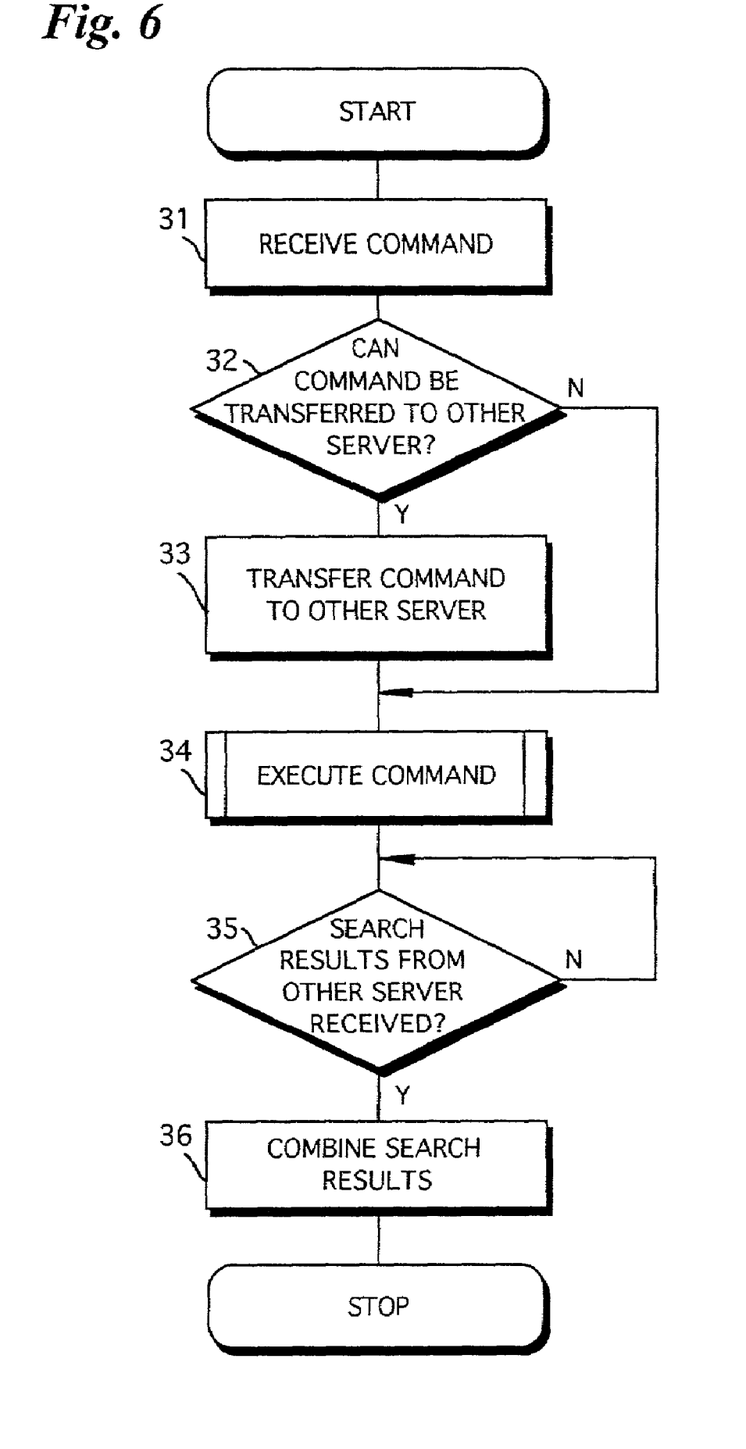
FIG. 6 is a flowchart illustrating processing for conducting a search of image data.

FIG. 6 is a flowchart illustrating processing for searching image data.

If a search command transmitted from the client computer 1 is received by the command receiving unit 11 of the first database server 10 (step 31), as described above, then it is determined whether the received search command can be transferred to the other servers 2 and 3 (step 32). A search command is accompanied by data for the purpose of determining whether the search command can be transferred, and the determination as to whether the search command can be transferred is made based upon the attached data.

If it is determined that transfer is possible ("YES" at step 32), then the search command is transferred to the servers 2 and 3 by the command resending unit 12 (step 33). If it is determined that transfer is not possible ("NO" at step 32), then the processing of step 33 is skipped.

Processing for searching image data is executed based upon the received search command (step 34). Image data is read out of the hard disk 19 by the search. The details of search processing will be described below. Processing for searching the image data is executed by the second database server 2 and third database server 3 as well and the results of this search are received by the command resending unit 12 of the first database server 10 ("YES" at step 35).

The results of the search by the first database server 10 and the results of the searches by the second database server 2 and third database server 3 are combined by the command execution unit 13 (step 36). More specifically, the items of retrieved image data are correlated in such a manner that the images represented by the image data obtained by the search results will be displayed in one window. The combined search results are transmitted from a result output unit 21 to the client computer 1 via the network. The images retrieved by the search are displayed on the display screen of the display unit of client computer 1.

The image data retrieved by the searches at the database servers 2 and 3 also are applied to the command execution unit 13. These results are combined in the command execution unit 13, as mentioned above, and thumbnail images corresponding to the search command are displayed. Thus, by designating a single expression format, image data having this expression format is obtained with regard to all images that have been stored on the hard disk 19. Since the search command is transferred to the other database servers 2 and 3 as well, many search results are obtained merely by applying a search command a single time.

Figure 7:
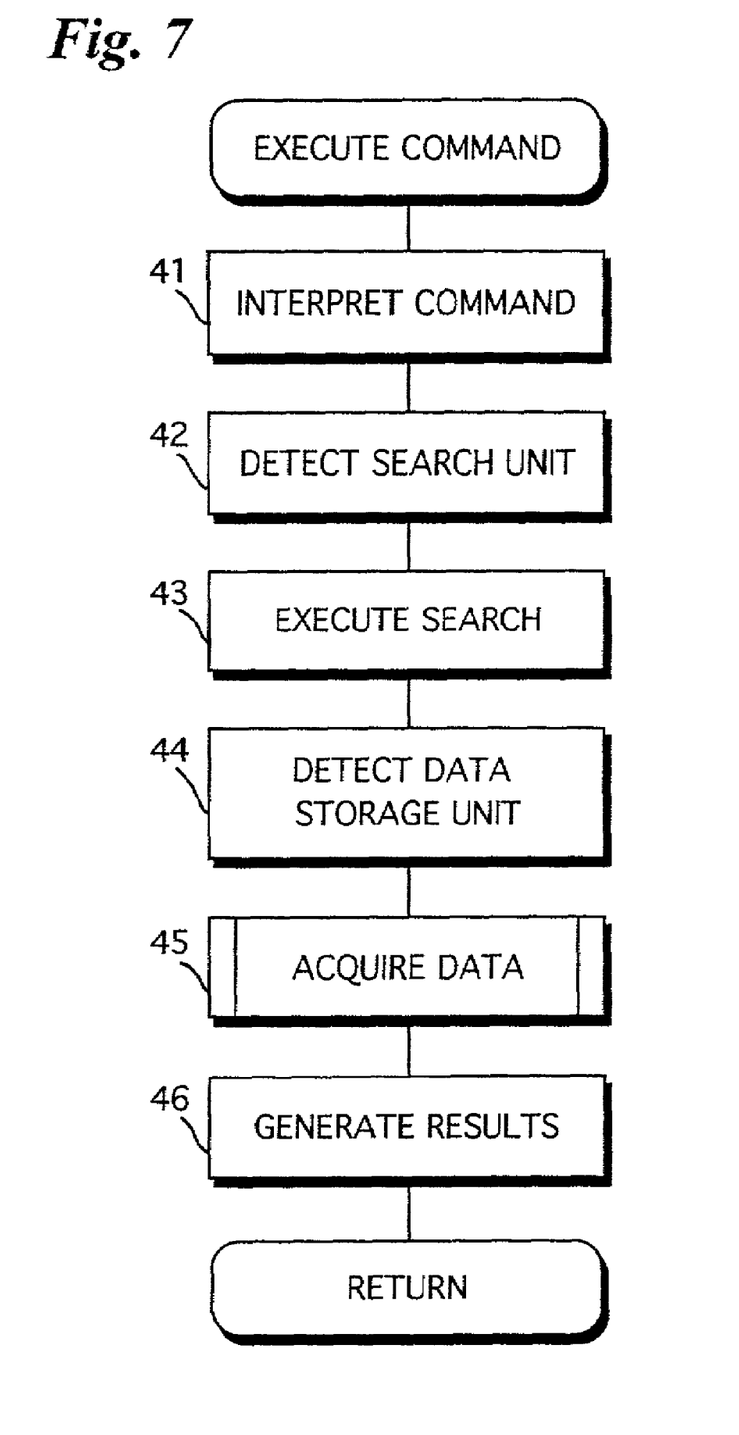
FIG. 7 is a flowchart illustrating processing for command execution.

FIG. 7 is a flowchart illustrating processing for command execution (this processing corresponds to that of step 34 in FIG. 6).

The content of a received search command is interpreted by the command execution unit 13 (step 41). When the content of the search command is interpreted, the search unit 15 is detected (step 42), whereupon the search unit 15 searches the RDBMS 16 based upon the search command (step 43). By searching the RDBMS 16, an image identification number corresponding to image data to be found is extracted.

Next, the data storage unit 18 is detected by the command execution unit 13 (step 44). Data representing the extracted image identification number is applied to the data storage unit 18 via the search interface 14, command execution unit 13 and storage interface 17. Image data corresponding to the extracted image identification number is read from the large-scale hard disk 19 by the data storage unit 18 (step 45). Processing for reading (acquiring) image data will be described later in greater detail. The image data read from the hard disk 19 is subjected to predetermined processing so as to be displayable (i.e., results are generated) (step 46).

Figure 8:
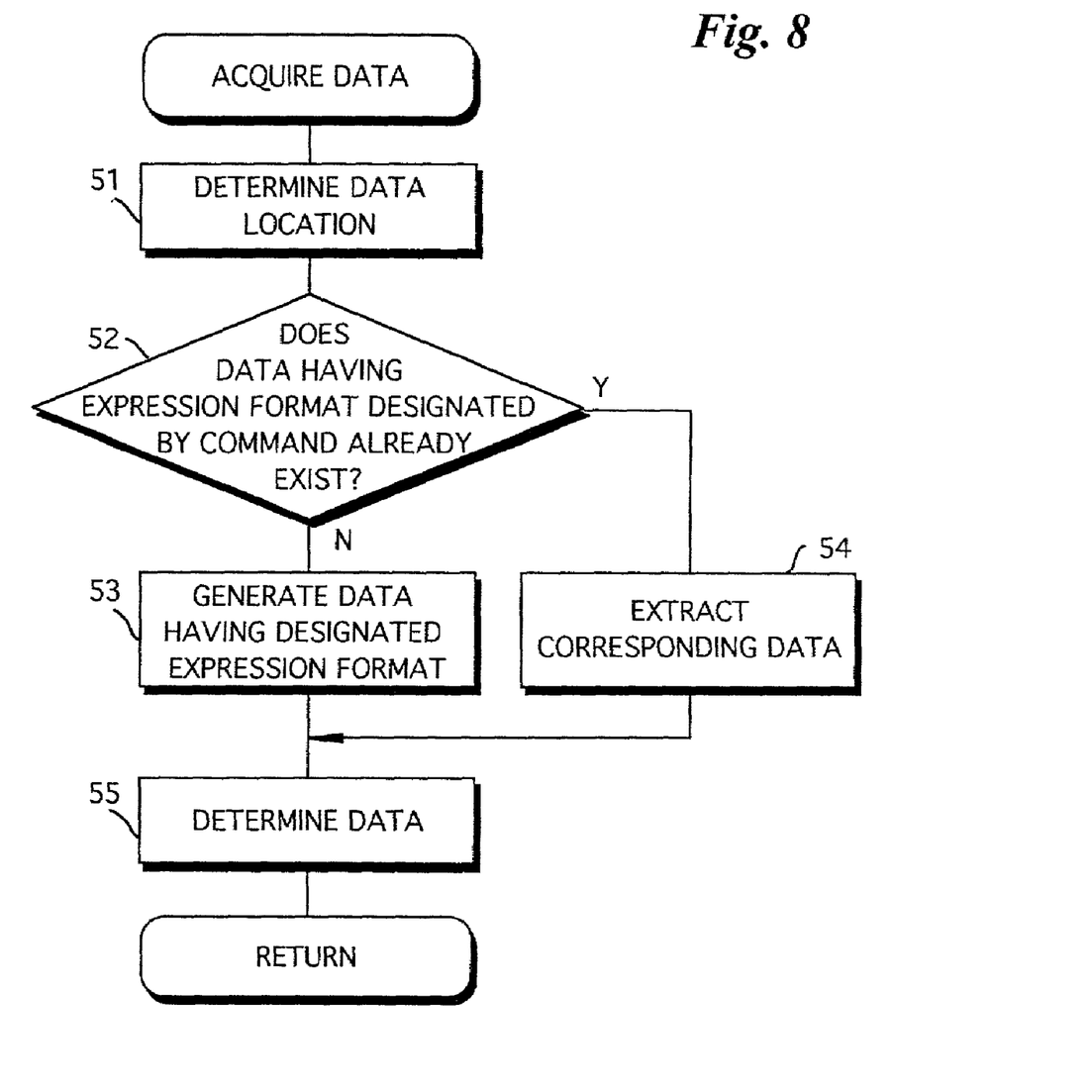
FIG. 8 is a flowchart illustrating processing for data acquisition.

FIG. 8 is a flowchart of processing for acquiring data (this processing corresponds to that of step 45 in FIG. 7).

In which area of the hard disk 19 the image data corresponding to the extracted image identification number has been stored is detected from this image identification number (i.e., the location of the data is determined) (step 51). The expression formats of the image data that has been stored in the detected area are checked.

If data having an expression format designated by the search command is already present in the hard disk 19 ("YES" at step 52), then the image data having the corresponding expression format is read from the hard disk 19 (step 54).

If data having the designated expression format has not been written to the hard disk 19 ("NO" at step 52), then the original-image data specified by the image identification number extracted from the RDBMS 16 is read from the hard disk 19. This read original-image data is then applied to the expression-format converter 20, where it is converted to image data having the designated expression format (step 53). A mark indicating that the data has been obtained as the result of a search is attached to the read image data (i.e., data is determined) (step 55).

For example, if the client computer 1 applies the following as a search command: "SELECT IMAGE AS THUMBNAIL FROM TABLE WHERE AGE=35" (which means that images of a record in which age agrees with 35 are to be acquired in the thumbnail expression format), then the attribute table that has been stored in the RDBMS 16 is searched and identification numbers for which age agrees with 35 are found. Data representing the identification number of a found image is applied to the data storage unit 18. From among items of image data corresponding to the identification number of the found image, image data having the thumbnail expression format is read by the data storage unit 18. With regard to image data that has not been stored on the hard disk 19 and has the thumbnail expression format, the original-image data is applied to the expression-format converter 20, which proceeds to generate image data having the thumbnail expression format. The read image data having the thumbnail expression format and the generated image data having the thumbnail expression format is applied to the command execution unit 13.

Though the foregoing embodiment is described as being implemented by hardware, it goes without saying that partial implementation by software is possible.

As many apparently widely different embodiments of the present invention can be made without departing from the spirit and scope thereof, it is to be understood that the invention is not limited to the specific embodiments thereof except as defined in the appended claims.

What is claimed is:

1. A database system comprising:
 a database in which data has been stored accessibly;
 a search device for accessing the database in accordance with an applied search command and searching data that has been stored in said database;
 a command execution device, to which a command is entered, for applying a search command to said search device in accordance with this entered command;
 a first interface for separably and directly connecting, without via a network, said search device and said command execution device,
  wherein said search device is replaceable by an other search device upon separation of said search device from said first interface, and
  wherein upon replacement of said search device by said other search device, said first interface separably and directly connects, without via a network, said other search device and said command execution device;
 a storage device for storing data readably;
 a storage controller for accessing said storage device and reading data that has been stored in said storage device or writing data to said storage device in accordance with an applied read/write command; and a second interface for separably connecting said storage controller and said command execution device;

said command execution device applying a read/write command to said storage controller in accordance with the entered command.

2. The system according to claim 1, wherein said search device employs a search technique different than a search technique of said other search device.

3. The system according to claim 1, further comprising a relational database management system containing attribute information corresponding to said data, wherein said relational database management system is searchable by said search device.

4. The system according to claim 1, further comprising a command receiving device for receiving the entered command from a client.

5. The system according to claim 1, further comprising a command resending device for transmitting the entered command to another database server.

6. The system according to claim 1, wherein said storage controller is replaceable by a second storage controller upon separation from said command execution device.

7. The system according to claim 6, wherein upon replacement of said storage controller by said second storage controller, said second interface separably connects said second storage controller and said command execution device.

8. The system according to claim 6, wherein said second storage controller is different than said storage controller.

9. The system according to claim 1, further comprising an expression-format converter for generating data having a desired expression format when it is determined that data having the desired expression format is not stored in the database.

10. The system according to claim 9, wherein said expression-format converter is separably connected to said command execution device by said second interface.

11. A database system comprising:
a database in which data has been stored accessibly;
a search device for accessing the database in accordance with an applied search command and searching data that has been stored in said database;
a command execution device, to which a command is entered, for applying a search command to said search device in accordance with this entered command;
a first interface for separably and directly connecting, without via a network, said search device and said command execution device;
a storage device for storing data readably;
a storage controller for accessing said storage device and reading data that has been stored in said storage device or writing data to said storage device in accordance with an applied read/write command; and
a second interface for separably connecting said storage controller and said command execution device,
wherein said command execution device applies a read/write command to said storage controller in accordance with the entered command,
wherein said search device is replaceable by an other search device upon separation of said search device from said first interface, and
wherein upon replacement of said search device by said other search device, said first interface separably and directly connects, without via a network, said other search device and said command execution device.

12. The system according to claim 11, wherein said search device employs a search technique different than a search technique of said other search device.

13. The system according to claim 11, further comprising a relational database management system containing attribute information corresponding to said data, wherein said relational database management system is searchable by said search device.

14. The system according to claim 11, further comprising a command receiving device for receiving the entered command from a client.

15. The system according to claim 11, further comprising a command resending device for transmitting the entered command to another database server.

16. The system according to claim 11, wherein said storage controller is replaceable by a second storage controller upon separation from said command execution device.

17. The system according to claim 16, wherein said second storage controller is different than said storage controller.

18. The system according to claim 16, wherein upon replacement of said storage controller by said second storage controller, said second interface separably connects said second storage controller and said command execution device.

19. A database system comprising:
a database in which data has been stored accessibly;
search means for accessing the database in accordance with an applied search command and searching data that has been stored in said database;
execution means, to which a command is entered, for applying a search command to said search means in accordance with the entered command;
first interface means for separably and directly connecting, without via a network, said search means and said execution means,
wherein said search means is replaceable by an other search means upon separation of said search means from said first interface means, and
wherein upon replacement of said search means by said other search means, said first interface means separably and directly connects, without via a network, said other search means and said execution means;
a storage device for storing data readably;
a storage controller for accessing said storage device and reading data that has been stored in said storage device or writing data to said storage device in accordance with an applied read/write command; and
second interface means for separably connecting said storage controller and said execution means;
said execution means applying a read/write command to said storage controller in accordance with the entered command.

* * * * *